Patented Feb. 7, 1939

2,146,257

UNITED STATES PATENT OFFICE 2,146,257

ADHESIVE FOR INSECTICIDES

Lyle D. Goodhue, Berwyn, Md., dedicated to the free use of the People of the United States No Drawing. Application September 23, 1938, Serial No. 231,313

4 Claims. (Cl. 167—42)

(Granted under the act of March 3, 1883, as amended April 30, 1928; 370 O. G. 757)

This application is in part a continuation of my pending application filed April 12, 1937, Serial No. 136,269.

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the People of the United States to take effect on the granting of a patent to me.

My invention relates to a new and useful adhesive which can be used to prevent the removal of sprayed or dusted insecticides and fungicides from plants by rain, wind, or a combination of these factors. More particularly my invention relates to a group of chemical compounds or mixtures thereof, which although non-adhesive when applied to plants with the insecticide, become adhesive, resinous, tacky and insoluble in water after exposure to sunlight.

A large number of substances and compositions of matter have been proposed as adhesives for insecticides applied both as a spray and as a dust. Those used with sprays may consist of emulsions of oils, resins or gums; solutions of sodium silicate or soluble gums; suspensions of starchy substances; skimmed milk or casein and many others.

For dusts the number of substances or combinations is considerably limited by the nature of the material. Insecticides applied as dusts must retain good dusting properties after the incorporation of the material to be used as the adhesive. Non-drying oils have been employed, but only a very small quantity can be mixed with the dust without damage to the dusting properties. Tacky resins have been used, but only in amounts less than about 3 percent of the weight of the dust. Soaps of heavy metals and the compounds forming these soaps have been used, in which case dependence is placed on the completion of a chemical reaction after sufficient water is obtained from dew or light rains. Starchy materials or substances capable of swelling by moisture have also been proposed.

My invention can be used with spray insecticides, but it is especially adapted for use with insecticides applied in the form of a dust. One advantage of my adhesive is that any amount of the material may be incorporated without materially changing the physical properties of the dust. Another advantage is that no dependence need be placed on moisture to cause the material to act as an adhesive. And still another advantage lies in the storage of such dusts containing the adhesive, since it is easy to protect the material from light in inexpensive bags, thus eliminating the difficulties due to caking when adhesives sensitive to moisture are used.

Several methods of incorporation with the insecticide may be used. For use with dusts simple mixing of the dry powered light sensitive compound with the insecticides gives good results. A better practice, however, is to grind the insecticide with the adhesive in a ball mill or other effective grinding machine. A still better but more complicated method of incorporation is to add the light sensitive adhesive to the dry insecticide in the form of a solution in water or organic solvents. After removal of the solvent the adhesive and insecticide mixture is pulverized before dusting. An amount of adhesive equal to from 5 to 25 percent of the weight of the insecticide is recommended.

For use with spray insecticides, the light sensitive composition may be dissolved in the water or added in the form of a suspension, depending on the solubility of the substance to be used as the adhesive.

In practicing my invention, I may use condensation products of furfural with aromatic amines, such as furfural-beta-naphthyl amine, furfural aniline, furfural-p-toluidine. Small amounts of catalysts which accelerate the reaction, such as iodoform or cupric chloride may be used as sensitizers.

The above materials have been tested and found to give tacky resins in from 1 to 4 hours exposure to daylight. During a test period of one week when the amount of rainfall was 0.95 inch from 50 to 90 percent of the insecticide was retained, using the above materials as adhesives. Where the same insecticides were dusted with no adhesive, the amount retained after the same period varied from practically nothing to 14 percent. The insecticides used for test purposes were lead arsenate, Paris green, and powered derris.

Having thus described my invention, I claim:

1. An adhesive for insecticides comprising the reaction products of furfural with aromatic amines of the group consisting of beta-naphylamine, aniline and p-toluidine.

2. An adhesive for insecticides comprising the reaction product of furfural with beta-naphthylamine.

3. An adhesive for insecticides comprising the reaction product of furfural with aniline.

4. An adhesive for insecticides comprising the reaction product of furfural with p-toluidine.

LYLE D. GOODHUE.